INVENTOR.
RICHARD S. FARR
BY Lyon & Lyon
ATTORNEYS

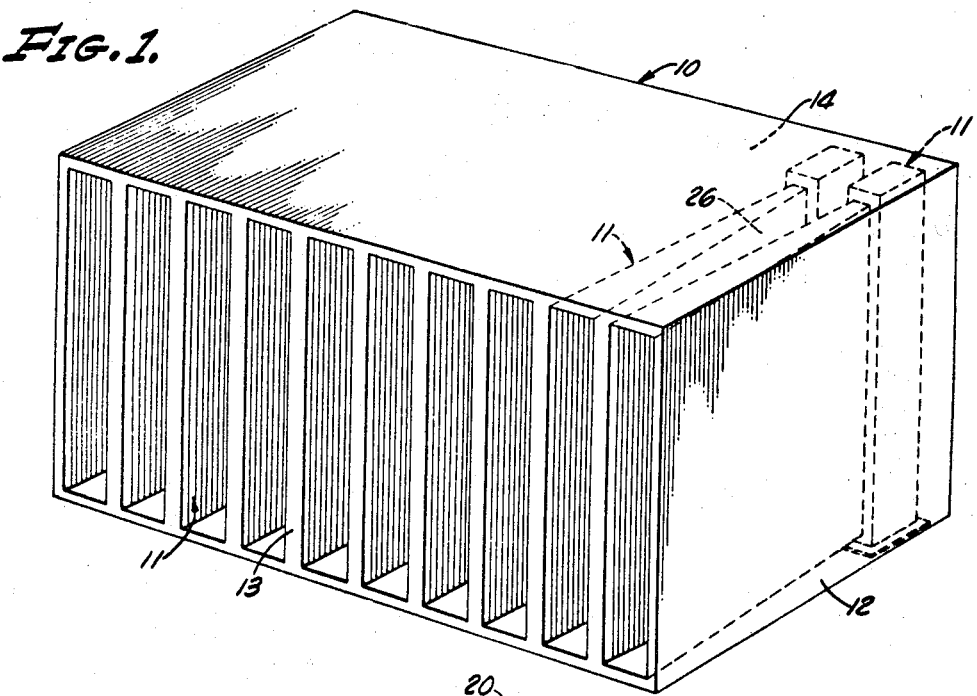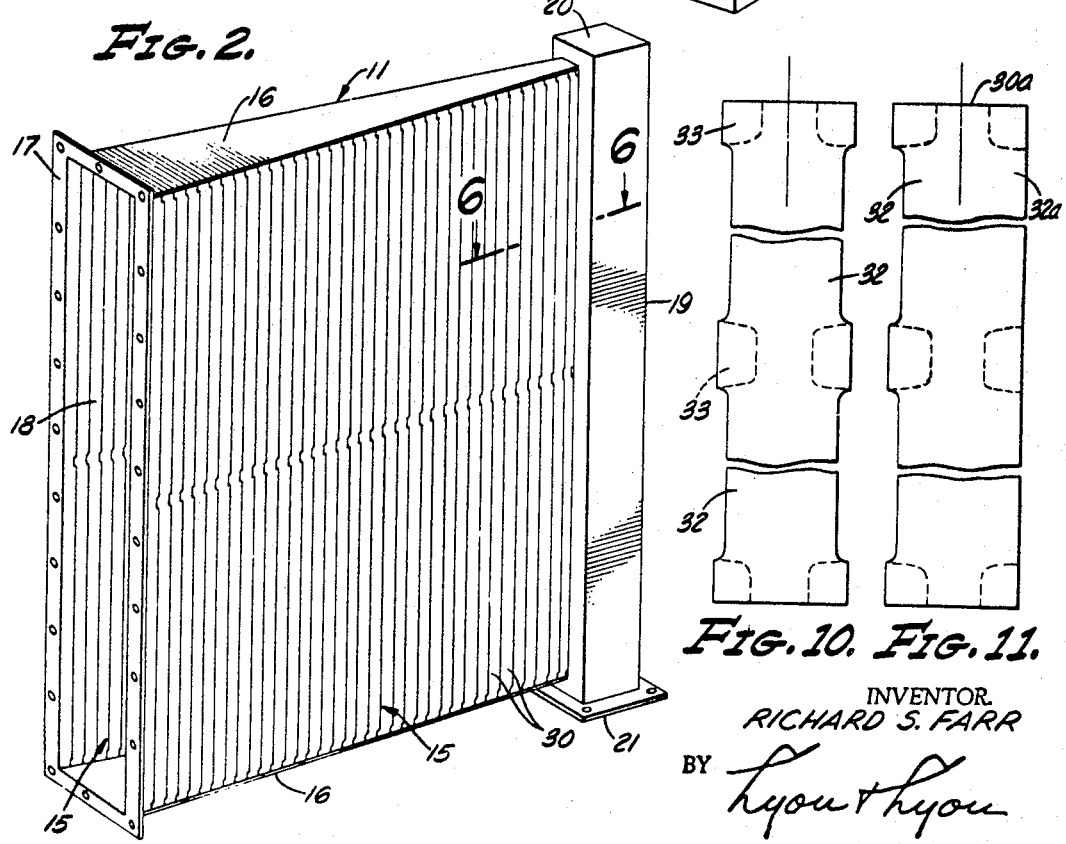

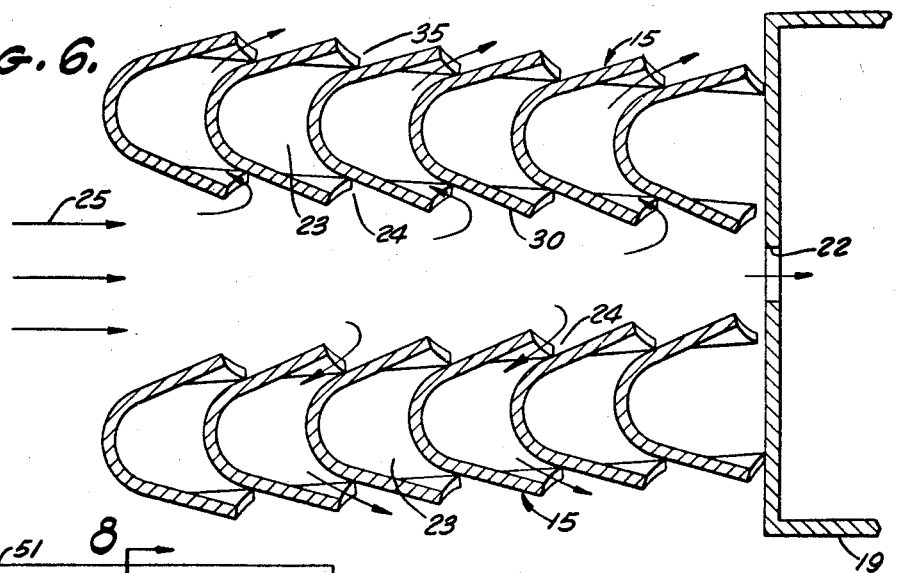
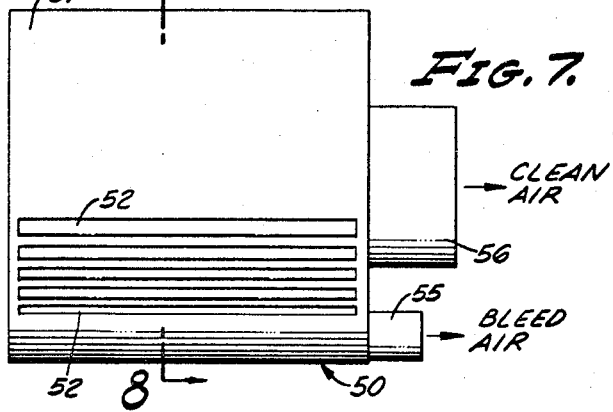
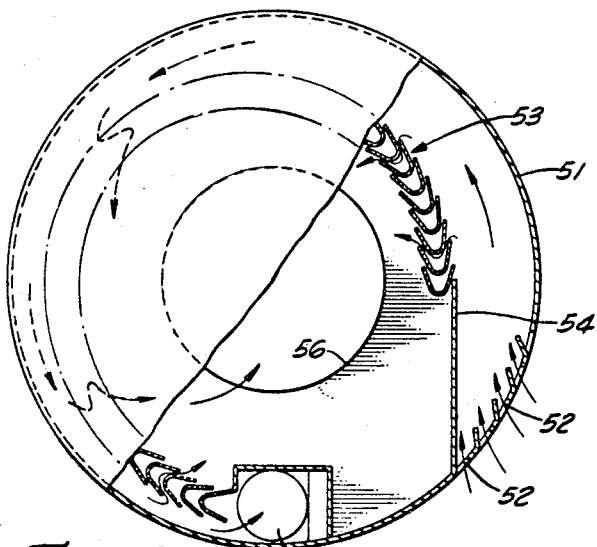
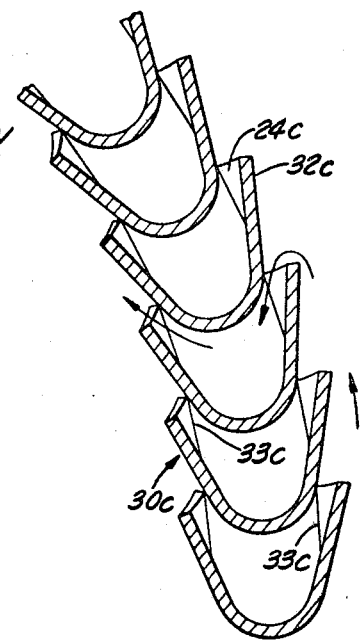
FIG. 6.
FIG. 7.
FIG. 8.
FIG. 9.
INVENTOR.
RICHARD S. FARR
BY Lyon & Lyon
ATTORNEYS

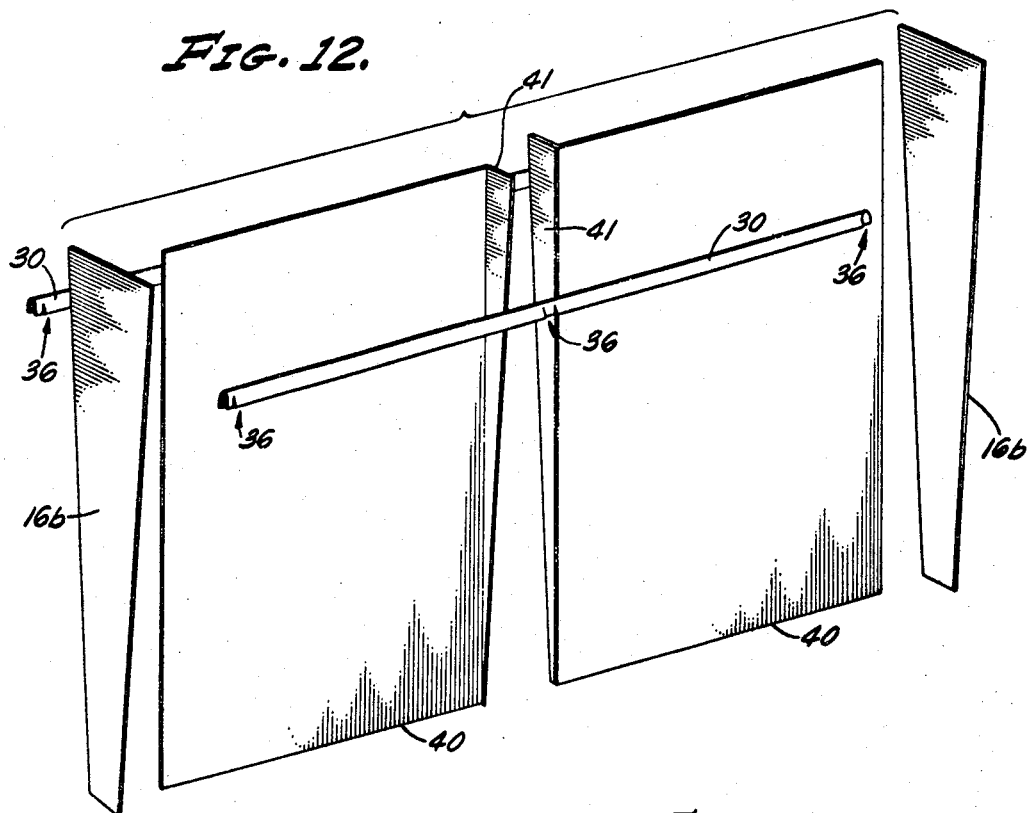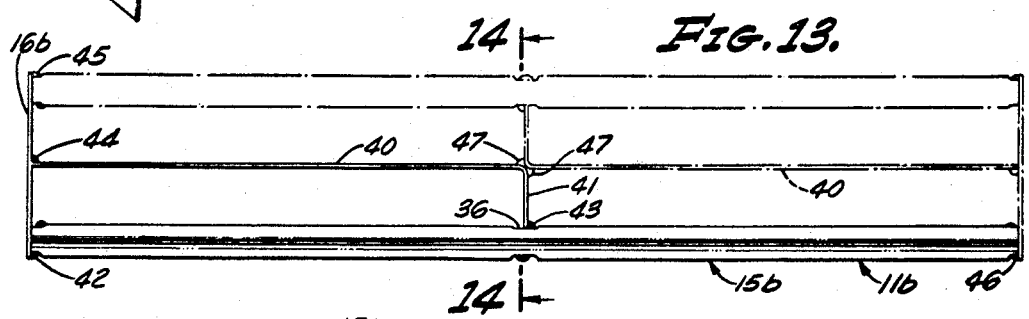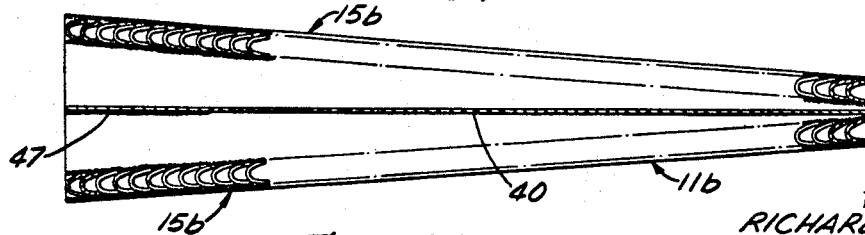

3,435,503
METHOD OF CONSTRUCTING A DEVICE FOR SEPARATING DUST FROM A GASEOUS FLUID
Richard S. Farr, Los Angeles, Calif., assignor to Farr Company, El Segundo, Calif., a corporation of California
Original application Feb. 28, 1964, Ser. No. 348,158, now Patent No. 3,369,349, dated Feb. 20, 1968. Divided and this application June 26, 1967, Ser. No. 658,972
Int. Cl. B21d 39/00; B23p 15/12, 19/04
U.S. Cl. 29—157                         4 Claims

ABSTRACT OF THE DISCLOSURE

A method for constructing an inertial type filter for separating dust from gaseous fluids such as air wherein a plurality of identical blades or vanes of generally arcuate cross-section are stacked in nesting relationship but with tabs formed on each blade to engage and separate it from the next adjacent blade to form the gas passageway between blades, the stack of blades is compressed to produce intimate contact and uniform spacing between blades and a weld is applied along the tabs to permanently assemble the blades together into a panel of the desired size.

---

This application is a divisional application of Ser. No. 348,158, filed Feb. 28, 1964, now Patent No. 3,369,349.

This invention relates to a method of making a device for separating and removing foreign particles or dust from air or other gaseous fluids at relatively high rates by means of inertial separation action and, in particular, is directed to an improved and unique construction of such a device which is less costly without loss of effectiveness.

The presence of particulate matter in air or other gases that are used for various purposes such as in industrial process and equipment is often objectionable for such uses and, therefore, the need for removing such particulate matter from the air or gases has become well recognized. For example, air contaminated by dust during an industrial process must be cleansed or filtered in some manner before the air is discharged to atmosphere in order to prevent undue pollution of the outdoor air. Another example is the well-known need for removing dust from the intake air to an internal combustion engine to prevent excessive wear or damage to the engine or other similar types of devices ingesting air during operation and this need for dust removal becomes particularly acute for earth moving equipment due to the high dust concentration present in the air. In response to such needs, various types of dust-separating devices have been developed including those employing the principles of inertial separation by sharply changing the direction of air or gas flow to cause the particulate matter to continue in the original direction of flow thereby removing the particulate matter from the air flowing in such sharply changed direction. Certain of these inertial separation type devices utilize a bleed-off arrangement whereby a small portion of the influent air or gas to the device is continually bled-off from that portion of the device where the particulate matter is at its highest concentration and in this manner the device is essentially self-cleaning.

Some of the many types of devices employing this inertial separation principle use curved or straight panels extending in the general direction of air flow with multiple lateral passageways through such panels of such a shape as to allow gas flow therethrough and exclude particulate matter by reason of the abrupt change in direction of gas flow. One such device is comprised of a pair of panels arranged in converging relationship to form a V-shaped cell with the air flow in the direction of convergence. When such device is of the "bleed-off" type, a slot is provided at the base or apex of the V and the particulate matter passes through such slot together with the "bleed-off" air. The panels have lateral passageways therethrough which may be formed in various manners, but in general are comprised of spaced vanes or louvers in a sheet. The particular form of the vanes or louvers and the resulting shape and size of passageways depends on the intended use and application of the device with respect to the type, size, percentage, etc. of the particulate matter desired to be removed by the device. Moreover, when a plurality of these V-shaped cells are positioned side-by-side in a single housing to achieve the desired volumetric capacity, the cleaned air flows out through outlets provided between the narrowed ends of the V-shaped cells. Therefore, it has been found advantageous for the tortuous passageways to also redirect the outlet air flow in a direction toward these outlets whereby substantial turbulence is avoided.

These many requirements to be accomplished by the elements of such inertial separating devices have dictated structures of complex configurations and constructions. For example, if it is desired that the lateral passageways through the panel be tortuous rather than a straight path and it is impossible to produce such passageways by merely providing louvers in a single sheet to form the panel. As a result it has been necessary to employ a multiplicity of specially formed blades or vanes appropriately spaced and mounted to provide the desired shape of passageway including redirecting the outlet air flow in the aforedescribed direction. Therefore, in prior inertial separating devices the construction and assembly of such vanes into a device entailed costly machine and manual operations.

An object of this invention is to provide a method and components for constructing unique and versatile panel assemblies for inertial type dust separating devices of any desired overall configuration without substantial variation in such method or components.

A further object of this invention is to provide a novel form of suitably shaped elongated blade having appropriate means for accurately spacing that blade from adjacent blades in an inertial type dust separating device to form accurately shaped and sized passageways between such blades. Still a further object of this invention is to provide such a blade which may be readily joined to the other blades to form an integral panel unit.

Other and more detailed objects and advantages of this invention will appear from the following description and the accompanying drawings, wherein:

FIGURE 1 is a perspective view of an inertial type dust separating device employing a plurality of V-shaped cells positioned side-by-side with such cells constructed in the manner of this invention.

FIGURE 2 is a perspective view of a single V-shaped cell for an inertial type dust separating device.

FIGURE 6 is an enlarged fragmentary sectional view of the base or apex portion of the V-shaped cell taken substantially on the line 6—6 in FIGURE 2.

FIGURE 7 is an elevation view of a modified form of inertial type dust separating device employing the elements and manner of construction of this invention.

FIGURE 8 is a partial sectional view of the modified form of the device shown in FIGURE 7 taken substantially on the line 8—8 in FIGURE 7.

FIGURE 9 is an enlarged fragmentary sectional view of the blades of the modified device of FIGURES 7 and 8.

FIGURES 10 and 11 are plan views, with portions removed, of the die-cut or blank shape of two embodiments of blades of the device of this invention before such blades are given their curved form.

FIGURE 12 is an exploded view of the components for constructing a modified form of V-shaped cell similar to that illustrated in FIGURE 2, but including central structural support members.

FIGURE 13 is a plan view of the modified construction of FIGURE 12 with one-half of the device shown in phantom lines for illustrating the symmetry of construction.

FIGURE 14 is a sectional elevation view of the modified construction of FIGURES 12 and 13 taken substantially on the line 14—14 in FIGURE 13.

Figure 3:
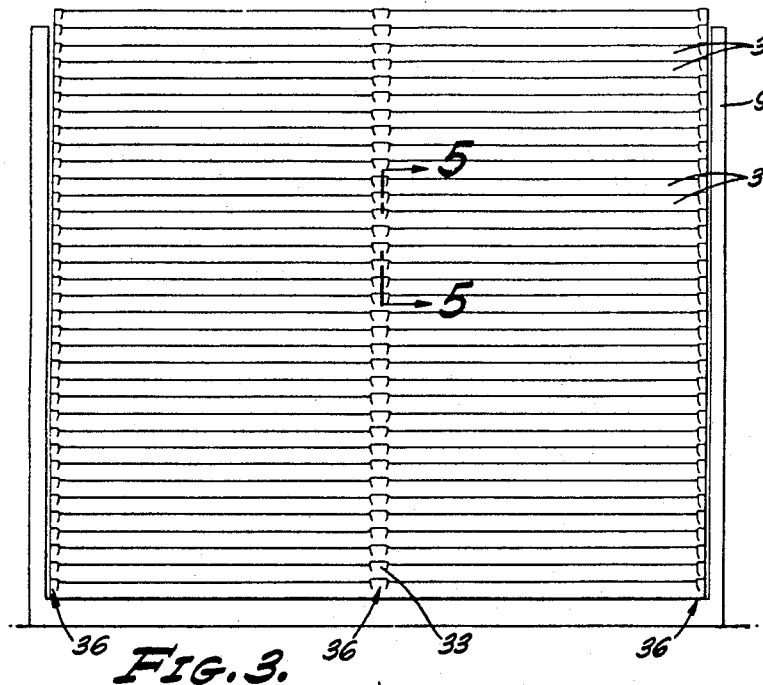
FIGURE 3 is an elevation view of a multiplicity of blades of this invention stacked in a fixture for forming a panel of the two converging panels of the V-shaped cell shown in FIGURE 2.

Referring more particularly to FIGURE 1, an assembled inertial type dust separating device, generally designated 10, is illustrated as being comprised of ten separate V-shaped inertial separating cells, each generally designated 11, positioned in side-by-side relation within a housing 12. In an installation the device 10 is positioned in the air or other gaseous fluid handling system with the face 13 of housing 12 forming the inlet to the device and the opposite face 14 forming the clean air outlet of the device 10. In this manner, the inlet and outlet directions of gaseous fluid flow are in substantially the same direction through the housing 12 as will appear more fully from the detailed description of cells 11 set forth below.

Each of the inertial type separating cells 11 mounted in device 10 is an integral unit adapted to function alone or in parallel with other cells as in the device 10. Each cell 11 includes a pair of major walls or panels, generally designated 15, positioned to converge toward each other in the direction toward the outlet thereby forming the referred to V-shape of the cell. The angle between the two panels 15, i.e., the degree of convergence, may be varied substantially depending on various factors such as the particular construction of panels 15 and the particular installation, but for the embodiment shown in FIGURES 1 through 6, an angle of 8° to 10° has been found preferable. The lateral ends of the cell 11 and also the ends of the two panels 15 are enclosed by end plates 16 to both confine the inlet gas flow between the panels 15 and structurally support the panels 15. An open rectangular flange 17 is connected to the longitudinal ends of panels 15 and plates 16 and defines the inlet opening 18 of the cell 11. At the other longitudinal end of the cell a "bleed-off" duct 19, often known as a "dust bin," is connected to the ends of panels 15 and plates 16. One end 20 of duct 19 is closed and the other end 21 is open and provided with appropriate flanging for connecting to the housing 12 and/or appropriate manifolding.

Referring in further detail to FIGURE 6, the converging ends of the panels 15 are slightly spaced from each other and a bleed slot 22 is provided in the duct 19 between such panels for allowing the separated dust and "bleed-off" air to pass into the duct 19. The details of and reasons for the exact construction and configuration of the panels 15 are hereinafter set forth but for an understanding at this point of the operation of cell 11, it is only necessary to note that panels 15 are provided with a multiplicity of lateral passageways 23 therethrough with the inner or inlet ends 24 of such passageways generally facing in the downstream direction of inlet air flow, i.e., the direction of arrows 25 in FIGURE 6. As is conventional with this type of device, the dust laden incoming air flows in through inlet opening 18 toward bleed slot 22 in the direction of arrows 25. Most of this air passes out through passageways 23 as clean air due to the inertia of the dust particles which prevents such particles from turning in the upstream direction into inlets 24 of the passageways 23. Therefore, the dust particles continue in the direction toward bleed slot 22 and are carried therethrough into duct 19 by a small proportion of the inlet air. When cells 11 are positioned side-by-side as in a device 10, the clean air flows longitudinally outwardly in the space 26 between adjacent cells. The flow of air through a cell 11 or device 10 may be caused by forcing air therethrough by means of an upstream blower or by drawing the air therethrough by means of a blower positioned downstream of the cell or device. When the air is drawn therethrough, a separate means (such as another suction blower) must be used on the outlet end 21 of "bleed-off" duct 19 for causing and controlling the flow of bleed air. However, when an upstream blower forces air through the cell or device then such separate means may not be necessary and in fact the bleed flow may be controlled by a throttling orifice on the outlet of "bleed-off" duct 19.

In order to construct the panels 15 and have the necessary and most desirable characteristics of the passageways 23 therethrough, it is specifically contemplated by this invention to construct the panels 15 of a multiplicity of vanes or blades 30 appropriately assembled to form a passageway 23 between each pair of adjacent blades. The blades 30 are enlongated and have a substantially U-shaped cross section comprised of a central curved portion 31 and a pair of straight skirt portions 32 extending from the curved portion. The skirt portions 32 diverge from each other at a preselected small angle suitable for achieving the desired blade characteristics and an angle of approximately 38° between the two skirt portions 32 has been found satisfactory. The skirt portions 32 extend tangentially from the curved portion 31 whereby the blade is of a smooth configuration to minimize the turbulence-generating configuration of the passageways 23. At the center and each end of each blade 30 the skirt portions 32 are provided with means for supporting and spacing each blade from the next adjacent blade and as shown in the drawings, these means may include an embossed spacer tab 33 formed integrally from the material of a portion of each skirt portion 32 by deforming the material inwardly. Opposed spacer tabs 33 on the two skirt portions 32 extend substantially parallel to each other rather than diverging as do the skirt portions. The exposed end 34 of each spacer tab engages the outside surface of the next adjacent blade 30 to establish a predetermined center-to-center spacing or "pitch" between adjacent blades to form the passageways 23 between the blades, as shown in FIGURE 6, and along the blades between the spacer tabs. The spacer tabs 33 provide the structural support between blades to maintain the proper spacing and while central and end spacer tabs have been shown, more or fewer tabs may be provided on longer or shorter, respectively, blade or blades of modified construction.

The combination of the configurations of the curved portion 31, skirt portions 32 and spacer tabs 33 determine the size and configuration of the passageways 23 including the inlet opening 24 and outlet opening 35 of the passageway. Such size and configuration of passageways 23 in turn determines the important operational properties of the device such as: dust removal efficieny, pressure drop required, tendency to clog, etc. It is essential to the proper performance of the cell 11 in separating and preventing dust particles from passing through the passageways 23, or at least dust particles of such size as are intended to be separated, that the passageways 23 be curved or tortuous rather than straight through the panel 15 and that such curvature be in the reversed direction from the incoming air. Further, in order to improve the operating characteristics of a cell 11 particularly when associated in side-by-side relation with other cells as in a device 10, it has been found extremely beneficial to redirect the clean air flowing out of passageways 23 in the direction of the clean air outlet of the device. The full importance of such an arrangement as accomplished by apparatus having an entirely different configuration is set forth in my copending patent application entitled "Dust Separating Device," Ser. No. 226,705, filed Sept. 27, 1962. Further, the size of inlet 24 and outlet 35 of passageway 23 has a substantial effect on the operation of the device. In particular, if the inlet or outlet is too small then it has been observed that there is a tendency for such small inlet or outlet to become clogged with very fine dust particles carried with the substantially clean air. Thus, although it is not essential, it is preferred for the most versatile blade shape to shorten or in effect trim the edge of the skirt portions 32 between the spacer tabs 33 as best illustrated by FIGURE 10. This effectively enlarges the inlet 24 and outlet 35 from that which would occur without such trimming and this is accomplished without changing the spacing between or "pitch" of the blades since the spacer tabs 33 are unaltered. For example, a highly satisfactory device has been constructed of blades of the shape of those shown in FIGURES 5 and 6 wherein the pitch is approximately one-half inch and the inlet 24 and outlet 35 are each one-eighth of an inch. As a modification the skirt portion 32a may be left untrimmed on one side of a modified blade 30a as shown in FIGURE 11 to produce an asymmetrical blade. As with blades 30, the asymmetrical blades 30a are stacked to form a panel and the untrimmed skirt portion 32a of each blade is positioned on the same side of the panel. Such a panel of asymmetrical blades may be arranged for air flow through the panel in either direction depending on the particular application of the device. For example, it has been found that with the untrimmed skirt portions 32a on the outlet side of the panel, the outlet air is discharged in more nearly the longitudinal direction thereby making the panel particularly suitable for use in multiple V-shaped cell devices 10 by minimizing the turbulence of the outlet air.

Figure 5:
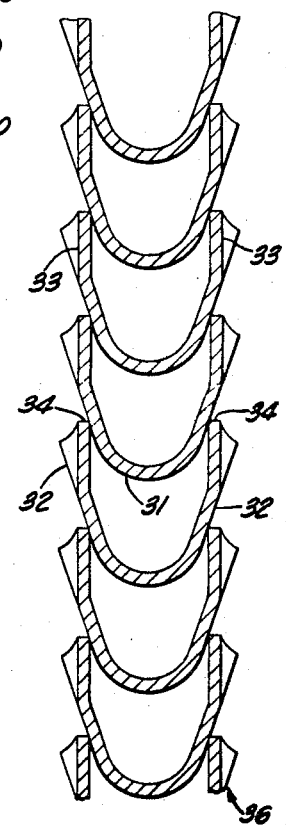
FIGURE 5 is an enlarged fragmentary sectional end view of some of the blades illustrated in FIGURE 3 taken substantially on the line 5—5 in FIGURE 3.
Figure 4:
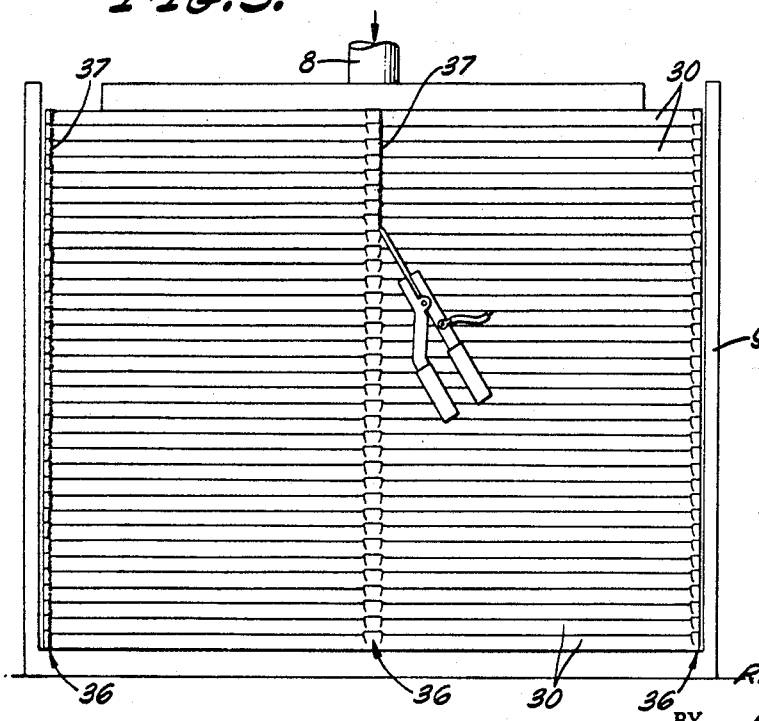
FIGURE 4 is an elevation view similar to FIGURE 3 with the stacked blades compressed from their relationship shown in FIGURE 3 and illustrating the welding process for forming such stacked blades into an integral unit.

In order to assemble the preformed blades 30 into a unit such as panel 15 for use in an inertial type dust separating device, an appropriate number of blades 30 are stacked in nesting relationship in a fixture 9 as shown in FIGURE 3. The fixture 9 supports the blades 30 in the desired shape of the panel whether flat, as shown in FIGURES 3, 4 and 5, or longitudinally curved for various modified devices. The spacer tabs 33 of each blade are laterally aligned with the corresponding spacer tabs on each of the other blades. Since the spacer tabs 33 of each blade have outer surfaces which are parallel and extend in the same longitudinal direction, the aligned corresponding spacer tabs of the aggregate of the blades comprise a series of flat surfaces forming, in effect, longitudinally interrupted planes 36 at the center and both ends on each side of the stack of blades. For identification purposes these planes 36 are hereinafter referred to as "welding surfaces" (the descriptiveness of such term will become apparent) although it is to be understood that every use of such term does not necessarily imply the presence or intended presence of a weld on such surface. The welding surfaces 36 are substantially flat and are only discontinuous at each blade for the small distance between the spacer tab end 34 of one blade and the beginning of the next spacer tab on the adjacent blade. Even this short distance is not in the form of a gap but rather is merely a small depression formed by the skirt portion 32 and the end 34 of the spacer tab. While still supported in the fixture 9, the stack of blades are longitudinally compressed to the desired longitudinal length of panel by any convenient means such as a press 8. This longitudinal compresion forces each blade into more intimate and positive contact with each adjacent blade thereby causing a more uniform blade pitch with resultant more uniform passageways 23. While the amount of compression may vary extensively due to various factors such as the configuration and the materials of the blades, for the particular embodiment shown in the drawings a longitudinal compression of approximately 10% has been found to be highly satisfactory. While the stack of blades 30 are maintained in this longitudinally compressed condition, means are applied to the welding surfaces 36 for forming the blades into an assembled panel and, as shown in the drawings, these means may include a continuous bead of weld 37 applied therealong. Since the welding surfaces 36 are relatively flat and continuous it is relatively simple to automatically or manually apply the continuous bead of weld 37. For structural strength of the panel it is preferred to apply a weld 37 at each welding surface 36. Moreover, it is preferred to provide a weld 37 on one side of a panel directly opposite a weld 37 on the other side of the panel to prevent warping of the panel. As thus welded the blades 30 are formed into an integral rigid unit or panel which may be readily assembled into any desired form of inertial type dust separating device such as cell 11 by merely welding end plates 16, frame 17 and bleed-off 19 to two such panels.

In FIGURES 12, 13 and 14 a modified construction of a V-shaped cell, generally designated 11b, is illustrated which is similar to the cell 11. A panel 15b is constructed in the same fashion as panel 15 heretofore described although one or more of the welds 37 may be omitted when such weld is applied during the final assembly procedure hereinafter described. An angle brace 40 is provided with a tapered flange 41 which is tapered at an angle equal to one-half of the desired included angle between the two panels 15b. A tapered end plate 16b is appropriately positioned on one lateral end of a panel 15b and a weld is applied at 42 for securing the plate and panel together. Next, the brace 40 is positioned with the tapered flange 41 engaging the center welding surface 36b and the other end of the brace engaging the center of end plate 16b. Welds are placed at 43 and 44 to secure the brace 40 to the panel 15b and the end plate 16b, respectively. An identical subassembly of a panel 15b, an end plate 16b, and a brace 40 is constructed and positioned in mating relation with the first such subassembly as shown in FIGURE 13. Welds are then applied at 45 and 46 to secure each of the end plates 16b to the end of the panel 15b of the other sub-assembly. The two braces 40 meet at the center and welds 47 are applied to a depth that is practical to achieve to thereby join the two braces 40. An inlet frame and a "bleed-off" duct similar to frame 17 and duct 19 may then be appropriately mounted to complete the cell.

Referring now more particularly to FIGURES 7, 8 and 9, a cylindrically shaped modified form inertial type separating device, generally designated 50, is illustrated. The closed-end cylindrical housing 51 is provided with peripheral inlet openings 52 which are preferably in the form of louvers to direct the inlet gas or air into the housing in a substantially circumferential direction. A spiral shaped panel 53 extends around the inside of housing 51 and the distance between the panel and the inside of the housing continually diminishes in the direction of air flow. The panel 53 may extend up to the inlet openings 52 or, as is preferred, a baffle extension 54 may be provided to be certain that the incoming air is flowing in the circumferential direction when the air first encounters the panel 53. A "bleed-off" duct 55 is provided at the downstream extremity of panel 53 for serving the same function as heretofore described with respect to "bleed-off" duct 19. A central axial outlet 56 is provided in housing 51 for the passage of clean air from the device 50. Panel 53 is constructed of a multiplicity of vanes or blades 30c which may be substantially identical to heretofore described blades 30 or 30a and in fact blades 30c are provided with one untrimmed skirt portion 32c the same as blade 30a of FIGURE 11. It is preferred, as shown in FIGURE 9, that the longer or untrimmed portion 32c be positioned on the outside of the curve of the panel 53 since the curvature of the panel tends to close down the inner opening between blades and open up the outer opening between blades. The blades 30c are provided with spacer tabs 33c to accomplish the spacing between blades and the mutual support of one blade on the next adjacent blade. Spacer tabs 33c will be provided on each end of each blade and whether additional such tabs are provided throughout the length of the blade depends on whether additional structural support is deemed necessary as heretofore discussed. Again, the laterally aligned spacer tabs 33c of the aggregate of the blades form longitudinally interrupted planes or welding surfaces extending in the direction of air flow similar to heretofore described welding surfaces 36 except that since panel 53 is curved in the air flow direction the welding surfaces will be identically curved. To construct the panel 53 the multiplicity of blades 30c are stacked in a spiral fixture, appropriately compressed in the spiral longitudinal direction, and welds are applied to the plurality of spiral welding surfaces formed by the spacer tabs 33c similar to the manner of application of welds 37 heretofore described.

Thus, it will readily appear to those skilled in the art that numerous styles of inertial type dust separating devices may be readily constructed by stacking the desired number of symmetrical or asymmetrical blades 30 or 30a, respectively, in the appropriate configuration of a panel for such a device and then compressing and welding as needed to form an integral unit. The shape of such a panel is virtually unlimited by using this manner of construction without even requiring variation in the blade configuration.

Having fully described the present invention, it is to be understood that it is not to be limited to the specific details set forth, but is of the full scope of the appended claims.

I claim:
1. A method of constructing an inertial type dust separating device comprising, the steps of: forming sheet metal into elongated blades having a curved central portion with two laterally extending straight skirt portions on opposite sides of said curved central portion diverging at a small angle and having spacer tabs deformed inwardly and integrally of said skirt portions, stacking a multiplicity of elongated blades in a fixture in nesting relation with said tabs aligned and spacing said blades apart, compressing said stack of blades a substantial amount, applying a substantially continuous weld along said spacer tabs to join said stack of blades into an integral panel in said compressed relation, and mounting said panel in cooperation with means for confining the direction of inlet air flow along said panel in the general direction of said diverging skirt portions.

2. The method of construction set forth in claim 1 wherein said spacer tab is formed in each skirt portion closely opposite a spacer tab in the other skirt portion and said weld is applied on each side of panel directly opposite each other.

3. A method of constructing a panel for an inertial type dust separating device using elongated blades which have two laterally extending straight skirt portions diverging from and on opposite sides of a central curved portion with spacer tabs formed in the skirt portions, comprising the steps of: stacking a multiplicity of blades in a fixture in nesting relation with said tabs aligned and spacing said blades apart, compressing said stack of blades to establish substantially uniform blade spacing, and applying a substantially continuous means along said spacer tabs for joining said stack of blades into an integral unit and retaining said blade spacing.

4. A method of constructing a panel for an inertial type dust separating device using elongated blades which have two laterally extending straight skirt portions diverging from and on opposite sides of a central curved portion with spacer tabs formed in the skirt portions, comprising the steps of: stacking a multiplicity of blades in a fixture in nesting relation, with the spacer tabs aligned, compressing said stack of blades a substantial amount for causing intimated and positive contact between blades and establishing substantially uniform blade spacing, and applying a substantially continuous weld along the aligned spacer tabs with said stack of blades compressed for joining said stack of blades into an integral unit and retaining said blade spacing.

References Cited
UNITED STATES PATENTS

| | | | |
|---|---|---|---|
| 2,140,993 | 12/1938 | Germonprez | 29—160 X |
| 2,245,908 | 6/1941 | Drake | 29—160 X |
| 2,119,134 | 5/1938 | Karmazin | 29—160 X |
| 2,693,636 | 11/1954 | Simpelaar | 29—472.3 |
| 2,976,954 | 3/1961 | Drevin | 55—442 X |
| 3,155,474 | 11/1964 | Sexton | 55—442 X |
| 3,237,386 | 3/1966 | Farr et al. | 55—443 |

CHARLIE T. MOON, *Primary Examiner.*

U.S. Cl. X.R.

29—160, 472.3, 455; 52—302